United States Patent
Goldman et al.

(10) Patent No.: US 8,407,575 B1
(45) Date of Patent: Mar. 26, 2013

(54) VIDEO CONTENT SUMMARY

(75) Inventors: Dan Goldman, Seattle, WA (US);
Connelly Barnes, Corvallis, OR (US);
Elya Shechtman, Seattle, WA (US)

(73) Assignee: Adobe Systems Incorporated, San Jose, CA (US)

( * ) Notice: Subject to any disclaimer, the term of this patent is extended or adjusted under 35 U.S.C. 154(b) by 991 days.

(21) Appl. No.: 12/315,038

(22) Filed: Nov. 26, 2008

Related U.S. Application Data

(60) Provisional application No. 61/191,594, filed on Sep. 10, 2008.

(51) Int. Cl.
G06F 17/00 (2006.01)
(52) U.S. Cl. .......................... 715/204; 345/629; 715/201
(58) Field of Classification Search .................. 345/629; 715/201, 204
See application file for complete search history.

(56) References Cited

U.S. PATENT DOCUMENTS

| | | | |
|---|---|---|---|
| 5,649,032 A * | 7/1997 | Burt et al. ..................... | 382/284 |
| 6,018,592 A | 1/2000 | Shinagawa et al. | |
| 6,263,088 B1 | 7/2001 | Crabtree et al. | |
| 6,347,152 B1 | 2/2002 | Shinagawa et al. | |
| 6,396,500 B1 * | 5/2002 | Qureshi et al. ................ | 345/473 |
| 6,987,520 B2 | 1/2006 | Criminisi et al. | |
| 7,088,870 B2 | 8/2006 | Perez et al. | |
| 7,336,851 B1 | 2/2008 | Cote | |
| 7,760,912 B2 | 7/2010 | Dana et al. | |
| 7,773,099 B2 | 8/2010 | Forlines et al. | |
| 7,826,683 B2 | 11/2010 | Phillips | |
| 8,139,850 B2 | 3/2012 | Maxwell et al. | |
| 8,139,867 B2 | 3/2012 | Maxwell et al. | |
| 2003/0099406 A1 | 5/2003 | Georgiev et al. | |
| 2004/0164996 A1 | 8/2004 | Criminisi et al. | |
| 2005/0128210 A1 | 6/2005 | Berger | |
| 2005/0128211 A1 | 6/2005 | Berger et al. | |
| 2005/0220348 A1 * | 10/2005 | Chiu et al. ..................... | 382/194 |
| 2006/0120624 A1 * | 6/2006 | Jojic et al. ..................... | 382/284 |
| 2006/0284874 A1 | 12/2006 | Wilson | |
| 2006/0285762 A1 | 12/2006 | Sun et al. | |
| 2007/0025637 A1 | 2/2007 | Setlur et al. | |
| 2008/0112642 A1 | 5/2008 | Matsushita et al. | |
| 2008/0238942 A1 | 10/2008 | Sun et al. | |
| 2008/0238945 A1 | 10/2008 | Wakizaka | |
| 2008/0292162 A1 * | 11/2008 | Gering et al. ................. | 382/131 |
| 2009/0141992 A1 | 6/2009 | Coulombe et al. | |
| 2009/0180713 A1 | 7/2009 | Bucha et al. | |
| 2010/0183242 A1 | 7/2010 | Brand | |
| 2010/0287511 A1 | 11/2010 | Meier et al. | |
| 2010/0289817 A1 | 11/2010 | Meier et al. | |

(Continued)

OTHER PUBLICATIONS

"What is a good nearest neighbors algorithm for finding similar patches in images?", European Conference on Computer Vision, II, pp. 364-378, published 2008.*

(Continued)

Primary Examiner — William Bashore
Assistant Examiner — Gregory A Distefano
(74) Attorney, Agent, or Firm — Wolfe-SBMC

(57) ABSTRACT

Among other disclosed subject matter, a computer program product is tangibly embodied in a tangible program carrier and includes instructions that when executed by a processor perform a method. The method includes obtaining a plurality of layouts generated from video content, each of the layouts comprising a visual summary of the video content at a respective zoom level, each visual summary including a plurality of frames selected from the video content and blended into the corresponding layout without borders between the frames. The method includes creating an animation between the plurality of layouts so that a user can zoom continuously between the zoom levels to view the visual summaries of the video content.

13 Claims, 6 Drawing Sheets
(6 of 6 Drawing Sheet(s) Filed in Color)

U.S. PATENT DOCUMENTS

2010/0328352 A1    12/2010   Shamir et al.
2011/0182502 A1    7/2011   Liang

OTHER PUBLICATIONS

"Video Collage: A novel presentation of video sequence", Wang et al., pp. 1479-1482, published 2007.*
"Summarizing visual data using bidirectional similarity", Simakov et al., pp. 1-8, published 2008.*
"Content-Based Video Retrieval using Mosaic Images", Hirakawa et al., published 2002, pp. 1-7.*
Buades, A., Coll, B., and Morel, J.M. 2005. A non-local algorithm for image denoising. In *Computer Vision and Pattern Recognition, 2005. CVPR 2005. IEEE Computer Society Conference on*, vol. 2, 60-65 vol. 2.
Criminisi, A., Perez, P., and Toyama, K. 2003. Object removal by exemplar-based inpainting. *Computer Vision and Pattern Recognition IEEE, Computer Society Conference on 2*, 721.
Drori, I., Cohen-or, D., and Yeshurun, H., 2003. Fragment-based image completion. *ACM Transactions on Graphics 22*, 303-312.
Fischler, M.A., and Bolles, R.C., 1981. Random sample consensus: a paradigm for model fitting with applications to image analysis and automated cartography. *Commun. ACM 24*, 6, 381-395.
Fitzgibbon, A., Wexler, Y., and Zisserman, A., 2003. Image-based rendering using image-based priors. In *ICCV '03: Proceedings of the Ninth IEEE International Conference on Computer Vision*, IEEE Computer Society, Washington, DC, USA 1176.
Freeman, W., Jones, T., and Pasztor, E. 2002. Example-based super-resolution. *Computer Graphics and Applications, IEEE 22*, 2(Mar./Apr.) 56-65.
Komodakis, N., and Tziritas, G. 2007, Image completion using efficient belief propagation via priority scheduling and dynamic pruning *IEEE Transactions on Image Processing 16*,11, 2649-2661.
Kopf, J., Fu, C.-W., Cohen-Or, D., Deussen, O., Lischinski, D., and Wong, T.-T. 2007. Solid texture synthesis from 2d exemplars. *ACM Transactions on Graphics (Proceedings of SIGGRAPH 2007)* 26, 3, 2:1-2:9.
Liu, X., Mei, T., Hua, X.-S., Yang, B., and Zhou, H.-Q., "Video Collage", in *MM '07*, pp. 461-462, dated 2007.
Pavic, D., Schonefeld, V., and Kobbelt, L. 2006. Interactive image completion with perspective correction. *The Visual Computer 22* (September), 671-681(11).
Sun, J., Yuan, L., Jia, J., and Shum, H.-Y. 2005. Image completion with structure propagation. In *SIGGRAPH '05:ACM SIGGRAPH 2005 Papers*, ACM, New York, NY, USA 861-868.
Wang, Y.-S., Tai, C.-L., Sorkine, O., and Lee, T.-Y. 2008. Optimized scale-and-stretch for image resizing. In *siggraph asia '08: ACM SIGGRAPH Asia 2008 papers*, ACM, New York, NY, USA, 1-8.
Wolf, L., Guttmann, M., and Cohen-Or, D., 2007. Non-homogeneous content-driven video-retargeting. In *Proceedings of the Eleventh IEEE International Conference on Computer Vision (ICCV-07)*.
Agarwala, A. et al., "Interactive Digital Photomontage," ACM Transactions on Graphics, 23(3):294-302, Aug. 2004.
Barnes, et al., "Supplementary Material for the Generalized PatchMatch Correspondence Algorithm", Downloaded from the internet at http://www.cs.princeton.edu/gfx/pubs/Barnes_2010_TGP/index.php on Sep. 9, 2010, 6 pages.
Barnes, et al., "The Generalized PatchMatch Correspondence Algorithm", Downloaded from the internet at http://www.cs.princeton.edu/gfx/pubs/Barnes_2010_TGP/index.php on Sep. 9, 2010, 14 pages.
Lin, et al. "Random Forests and Adaptive Nearest Neighbors", Technical Report No. 1055, Downloaded from the internet on Sep. 7, 2010 at www.stat.wisc.edu/Department/techreports/tr1081.pdf; May 29, 2002, 31 pages.
Agarwala, A., Dontcheva, M., Agrawala, M., Drucker, S., Colburn, A., Curless, B., Salesin, D., and Cohen, M., "Interactive digital photomontage", *ACM Trans. Graph. 23*, 3, pages 294-302, dated 2004.
Ashikhmin, M., "Synthesizing natural textures", in *I3D '01 Proceedings of the 2001 symposium on Interactive 3D graphics*, ACM, New York, NY, USA, pp. 217-226, dated 2001.
Arya, S., Mount, D., Netanyahu, N., Silverman, R., and Wu, A., "An optimal algorithm for approximate nearest neighbor searching in fixed dimensions", in *Proc. Fifth Symp. Discrete Algorithms (SODA)*, pp. 573-582, dated 1994.
Avidan, S., and Shamir, A., "Seam carving for content-aware image resizing", in *ACM Trans. Graph. 26*, 3, 10, dated 2007.
Barnes, Connelly, Shechtman, Eli, Finkelstein, Adam and Goldman, Dan B., "A Randomized Algorithm for Nearest Neighbor Fields", dated Sep. 8, 2008, p. 1-5.
Bertalmio, M., Sapiro, G., Caselles, V., and Ballester, C., "Image inpainting", in *SIGGRAPH '00: Proceedings of the 27th annual conference on computer graphics and interactive techniques*, ACM Press/Addison-Wesley Publishing Co., New York, NY, USA, pp. 417-424, dated 2000.
Bourdev and Brandt, "Robust Object Detection Via Soft Cascade" in *Proceedings from CVPR 2005, IEEE Computer Society*, pp. 2236-2243.
Boykov, Y., Veksler, O., and Zabih, R., "Fast approximate energy minimization via graph cuts", in *Pattern Analysis and Machine Intelligence, IEEE Transactions on 23*,11 (Nov), pp. 1222-1239, dated 2001.
Cho, T. S., Butman, M., Avidan, S., and Freeman, W., "The patch transform and its applications to image editing", in *Computer Vision and Pattern Recognition, 2008. CVPR 2008. IEEE Conference on* (June), pp. 1-8, dated 2008.
Criminisi, A., Perez, P., and Toyama, K., "Region filling and object removal by exemplar-based image inpainting", in *IEEE Trans. Image Processing 13*, 9 (Sept.),p. 1200-1212, dated 2004.
Datar, Immorlica, Indyk, and Mirrokni, "Locality-sensitive hashing scheme based on p-stable distributions", in *COMPGEOM: Annual ACM Symposium on Computational Geometry*, dated 2004.
Efros, A. A., and Freeman, W.T., "Image quilting for texture synthesis and transfer", in *SIGGRAPH 2001, Computer Graphics Proceedings*, ACM Press/ACM SIGGRAPH, E. Fiume, Ed., pp. 341-346, dated 2001.
Efros, A. A., and Leung, T. K., "Texture synthesis by non-parametric sampling", in *Computer Vision, IEEE International Conference on 2*, p. 1033, dated 1999.
Freeman, W. T., Pasztor, E. C., and Y, O. T. C., "Learning low-level vision", in *International Journal of Computer Vision 40*, dated 2000.
Hertzmann, A., Jacobs, C. E., Oliver, N., Curless, B., and Salesin, D., "Image analogies", in *SIGGRAPH*, pp. 327-340, dated 2001.
Kumar, N., Zhang, L., and Nayar, S.K., "What is a good nearest neighbors algorithm for finding similar patches in images?", in *European Conference on Computer Vision, II*: pp. 364-378, dated 2008.
Kwatra, V., Essa, I., Bobick, A., Kwatra N., "Texture optimization for example-based synthesis", in *ACM Trans. Graph.*, 24(3): pp. 795-802, dated 2005.
Kwatra V., Schdl, A., Essa, I., Turk, G., and Bobick, A., "Graphcut textures: Image and video synthesis using graph cuts", in *ACM Transactions on Graphics, SIGGRAPH 2003* 22, 3 (July), pp. 277-286, dated 2003.
Lefebvre, S., and Hoppe, H., "Parallel controllable texture synthesis", in *ACM Trans. Graph 24, 3*, pp. 777-786, dated 2005.
Liang, L., Liu, C., Xu, Y.-Q., Guo, B., and Shum, H.-Y., "Real-time texture synthesis by patch-based sampling" in *ACM Trans. Graph. 20, 3*, pp. 127-150, dated 2001.
Liu, F., and Gleicher, M., "Automatic image retargeting with fisheye-view warping", in *UIST, ACM*, P. Baudisch, M Czerwinski and D.R. Olsen, Eds., pp. 153-162, dated 2005.
Mikolajczyk, K., and Matas, J. G., "Improving descriptors for fast tree matching by optimal linear projection", in *International Conference on Computer Vision*, pp. 1-8, dated 2007.
Mount, D.M., and Arya, S., "ANN: A library for approximate nearest neighbor searching", dated Oct. 28, 1997.
Rong, G., and Tan, T.-S., "Jump flooding in gpu with applications to voronoi diagram and distance transform", in *I3D '06: Proceedings of the 2006 symposium on Interactive 3D graphics and games*, ACM, New York, NY, USA, pp. 109-116, dated 2006.
Rother, C., Kumar, S., Kolmogorov, V., and Blake, A., "Digital tapestry", in *IEEE Computer Vision and Pattern Recognition or CVPR, I*, pp. 589-596, dated 2005.

Rother, C., Bordeaux, L., Hamadi, Y., and Blake, A., "Autocollage", in *ACM Trans. Graph 25, 3*, pp. 847-852, dated 2006.
Rubinstein, M., Shamir, A., and Avidan, S., "Improved seam carving for video retargeting", in *ACM Transactions on Graphics (SIGGRAPH)* 27, 3, dated 2008.
Setlur, V., Takagi, S., Raskar, R., Gleicher, M., and Gooch, B., "Automatic image retargeting", in *MUM, ACM*, M Billinghurst, Ed., vol. 154 *of ACM International Conference Proceeding Series*, pp. 59-68, dated 2005.
Shiratori, T., Matsushita, Y., Tang, X., and Kang, S. B., "Video completion by motion field transfer", in *Computer Vision and Pattern Recognition, 2006 IEEE Computer Society Conference on 1* (June), pp. 411-418, dated Jun. 2006.
Simakov, D., Caspi, Y., Shechtman E., and Irani, M., "Summarizing visual data using bidirectional similarity", in *Proc. IEEE Conference on Computer Vision and Pattern Recognition (CVPR)*, pp. 1-8, dated 2008.
Tong, X., Zhang, J., Liu, L., Wang, X., Guo, B., and Shum, H.-Y., "Synthesis of bidirectional texture functions on arbitrary surfaces", in *ACM Transactions on Graphics 21*, 3 (July), pp. 665-672, dated Jul. 2002.
Tourapis, A. M., "Enhanced predictive zonal search for single and multiple frame motion estimation", in *VCIP, SPIE*, C. C. J. Kuo, Ed., vol. 4671 *of Proceedings of SPIE*, pp. 1069-1079, dated 2002.
Wang, T., Mei, T., Hua, X.-S., Liu, X., and Zhou, H.-Q., "Video collage: A novel presentation of video sequence", in *ICME, IEEE*, pp. 1479-1482, dated 2007.
Wei, L. Y., and Levoy, M., "Fast texture synthesis using tree-structured vector quantization", in *SIGGraph-00*, pp. 479-488, dated 2000.
Wei, L.-Y., Han, J., Zhou, K., Bao, H., Guo, B., and Shum, H.-Y., "Inverse texture synthesis", in *ACM Trans. Graph 27*, 3, pp. 1-9, dated 2008.
Wexler, Y., Shechtman, E., and Irani, M., "Space-time video completion", in *Computer Vision and Pattern Recognition, IEEE Computer Society Conference on 1*, pp. 120-127, dated 2004.
Wexler, Y., Shechtman, E., and Irani, M., "Space-time completion of video", in *IEEE Trans. Pattern Analysis and Machine Intelligence 29*, 3, (Mar.), pp. 463-476, dated Mar. 2007.
Yianilos, P.N., "Data structures and algorithms for nearest neighbor search in general metric spaces", in *SODA*, pp. 311-321, dated 1993.
"AutoCollage" [online] Microsoft Research 2008, [retrieved on Nov. 26, 2008]. Retrieved from he Internet: <URL: http://research.microsoft.com/autocollage/>.
'phpFlicke' [online] "phpFlickr version 3.1," Jan. 2011, [retrieved on Jan. 26, 2012]. Retrieved from the Internet: <URL: http://phpflickr.com>. 4 pages.
'Web-Archive' [online] "Creative Commons," 2010, [retrieved on Jan. 26, 2012]. Retrieved from Internet: <URL: http://web.archive.org/web/20100130095204/http:/creativecommons.org/> . 3 pages.
'Wikipedia' [online] "Java (programming language)," 2002, [retrieved on Jan. 27, 2012]. Retrieved from the Internet: <URL: http://en.wikipedia.org/w/index.php?title=Java_(programming_language)&oldid=550214>. 7 pages.
'Wikipedia' [online]. "OpenGL," Dec. 2004, [retrieved on Jan. 27, 2012]. Retrieved from the Internet: <URL: http://en.wikipedia.org/w/index.php?title=OpenGL&oldid=9281664>. 3 pages.
Baker, S. and Kanade, T. "Limits on Super-Resolution and How to Break Them." IEEE Transactions on Pattern Analysis and Machine Intelligence, vol. 24, No. 9, Sep. 2002, 36 pages.
Bay et al. "SURF: Speeded Up Robust Features." Computer Vision and Image Understanding (CVIU), vol. 110, No. 3, 2008, 14 pages.
Boiman et al. "In Defense of Nearest-Neighbor Based Image Classification." Academic Paper, The Weizmann Institute of Science, Jun. 2008, 8 pages.
Chang et al. "Super-Resolution Through Neighbor Embedding." Computer Vision and Pattern Recognition, 2004. CVPR 2004. Proceedings of the 2004 IEEE Computer Society Conference, Jul. 2004, 8 pages.
Chen et al. "Sketch2Photo: Internet Image Montage." ACM Transactions on Graphics (TOG)—Proceedings of ACM SIGGRAPH Asia 2009, Dec. 2009, 10 pages.
Dale et al. "Image Restoration using Online Photo Collections." Proc. IEEE Conference on Computer Vision, Sep. 2009, 8 pages.
Eisemann et al. "Photo Zoom: High Resolution from Unordered Image Collections." SIGGRAPH 2010, Los Angeles, California, May 2010, 1 page.
HaCohen et al. "Image Upsampling via Texture Hallucination." IEEE International Conference on Computational Photography, Mar. 2010, 8 pages.
Han et al. "Multiscale Texture Synthesis." ACM Transactions on Graphics, vol. 27, No. 3, Aug. 2008, 8 pages.
Hays and Efros. "Scene Completion Using Millions of Photographs." SIGGRAPH 2007, San Diego, California, Aug. 2007, 7 pages.
Johnson et al. "CG2Real: Improving the Realism of Computer Generated Images Using a Large Collection of Photographs." IEEE Transactions on Visualization and Computer Graphics, vol. 17, No. 6, Sep. 2011, 13 pages.
Kaneva et al. "Infinite Images: Creating and Exploring a Large Photorealistic Virtual Space." Proceeding of the IEEE, vol. 98, No. 8, Aug. 2010, 17 pages.
Kirkpatrick et al. "Optimization by Simulated Annealing." Science, vol. 220, No. 4598, May 1983, 10 pages.
Liu et al. "Face Hallucination: Theory and Practice." International Journal of Computer Vision (IJCV), vol. 75, No. 1, Oct. 2007, 33 pages.
Lowe, D.G. "Object Recognition from Local Scale-Invariant Features." Computer Vision, 1999. The Proceedings of the Seventh IEEE International Conference, Kerkyra, Greece, Sep. 1999, 8 pages.
Miranda et al. "New Routes from Minimal Approximation Error to Principal Components." Neural Processing Letters, vol. 27, No. 3, Jun. 2008, 14 pages.
Pandey et al. "Nearest-Neighbor Caching for Content-Match Applications." International World Wide Web Conference Committee (IW3C2), Madrid, Spain, Apr. 2009, 10 pages.
Peterson, J. L. "Computer Programs for Detecting and Correcting Spelling Errors." Computing Practices: Communications of the ACM, vol. 23, No, 12, Dec. 1980, 12 pages.
Snavely et al. "Photo Tourism: Exploring Photo Collections in 3D." ACM Transactions on Graphics (SIGGRAPH Proceedings), vol. 25, No. 3, Jul. 2006, 12 pages.
Wang et al. "Factoring Repeated Content Within and Among Images." ACM Trans. on Graphics (SIGGRAPH), vol. 27, No. 3, Aug. 2008, 10 pages.
Webb, A. R. "Chapter 6. Nonlinear Discriminant Analysis—Projection Methods." Statistical Pattern Recognition, Jul. 2009, 22 pages.

* cited by examiner

VIDEO CONTENT SUMMARY

CROSS-REFERENCE TO RELATED APPLICATIONS

This application claims priority from U.S. Provisional Application Ser. No. 61/191,594 filed Sep. 10, 2008, and entitled "Video Content Summary" the contents of which are incorporated herein by reference.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

This specification relates to digital graphics data processing.

It can be difficult for a user to quickly understand or navigate through videos. This is due to the large volume of data in a video. For example, a DVD film typically contains 200,000 frames, and before editing, a typical film has around 4 million frames of raw footage. Research has been done to help users navigate through videos. Previous results in video summarization have mostly focused on selecting important (key) frames, and arranging these frames in layouts with hard borders between the frames. Examples of such existing approaches include rectangular layouts and layouts based on Voronoi regions.

SUMMARY

The invention relates to summarizing video content.

In a first aspect, a computer program product is tangibly embodied in a tangible program carrier and includes instructions that when executed by a processor perform a method. The method includes obtaining a plurality of layouts generated from video content, each of the layouts comprising a visual summary of the video content at a respective zoom level, each visual summary including a plurality of frames selected from the video content and blended into the corresponding layout without borders between the frames. The method includes creating an animation between the plurality of layouts so that a user can zoom continuously between the zoom levels to view the visual summaries of the video content.

Implementations can include any or all of the following features. The method can further include configuring each of the plurality of layouts to form a tapestry showing the corresponding visual summary; and providing navigation from each tapestry to the video content such that the user can initiate presentation of the video content from a frame by selecting that frame in at least one of the tapestries. Obtaining the plurality of layouts can include selecting the plurality of frames from the video content; assembling the plurality of frames side-by-side in a pattern; and blending the plurality of frames into the corresponding layout, including removing borders between the frames. The pattern can include a brickwork-like organization of the frames in at least two rows, wherein the rows are merged into one in the blending. The blending can take into account a bidirectional similarity measure between the video content and the layouts, including a completeness criterion of each layout with regard to the video content, and a coherence criterion of each layout with regard to the video content. The method can further include selecting a visual feature present in at least part of the video content; and weighting the visual feature in performing the blending. Creating the animation can include filling in spacetime gaps between adjacent pairs of first and second layouts, the first layout being smaller than the second layout and at a lower zoom level than the second layout. Filling in the spacetime gaps can include identifying corresponding color regions in the layouts, including performing an approximate nearest-neighbor matching of patches from the first layout to the second layout. The method can further include verifying that matching color regions are stable under small perturbations, including: (i) calculation of scalar values for points in the first layout depending on a difference in coordinates between nearest-neighbor patches; (ii) selecting patches of the first layout based on the scalar values and at least one threshold value; and (iii) generating at least one additional layout using the selected patches, the additional layout filling in the spacetime gap between the first and second layouts. The selected patches can form island images of color data that are present at different positions in both the first and second layouts, and the method can further include constraining the island images to move at a constant velocity in the animation from the second layout to the first layout; defining time values corresponding to the animation from the second layout to the first layout; and for each of the time values: (i) resizing the second layout so that its image width changes linearly from a second-layout width to a first-layout width; (ii) inserting constrained color data for the island images; and (iii) applying an iterative update rule to patches until convergence.

In a second aspect, a computer program product is tangibly embodied in a tangible program carrier and includes instructions that when executed by a processor perform a method including receiving a first input that a user generates, a user generating the first input using an input control that forms an interactive tapestry as a visual summary of video content. The method includes selecting a first frame in the video content based on where in the interactive tapestry the first input is generated. The method includes presenting, in response to the first input, at least part of the video content beginning at the first frame.

Implementations can include any or all of the following features. The tapestry can contain a plurality of zoom levels such that the user can zoom continuously between the zoom levels to view the visual summaries of the video content, and the method can further include receiving a second input generated by the user using the input control; selecting another zoom level than a current zoom level based on the second input; and performing, in response to the second input, a continuous animation of the interactive tapestry from the current zoom level to the other zoom level. The method can further include receiving a third input that the user generates using the input control; selecting a second frame in the video content based on where in the interactive tapestry the third input is generated; and presenting, in response to the third input, at least part of the video content beginning at the second frame. The method is performed in an editing application, and the method can further include receiving a second input from the user after presenting at least part of the video content, the second input indicating an edit of the video content; and modifying the video content based on the second input. The method can be performed in a DVD player device, the video content can include DVD content, and the input control can include a scene selection function for viewing a scene of the DVD content in the DVD player device. The method can be performed in an online application generating a publicly available page for users to view videos, and the input control can include a content selection function for viewing contents of the videos on the publicly available page.

In a third aspect, a computer program product is tangibly embodied in a computer-readable storage medium, the computer program product including instructions that, when executed, generate on a display device a graphical user interface including an input control that forms an interactive tapestry as a visual summary of video content, the interactive tapestry comprising a plurality of zoom levels such that a user can zoom continuously between the zoom levels to view visual summaries of the video content. The graphical user interface includes a video content presentation area configured to present at least part of the video content starting at a frame thereof in response to the user selecting that frame in the interactive tapestry at any of the zoom levels.

Implementations can include any or all of the following features. The graphical user interface can be implemented in an editing application that modifies the video content based on receiving an input from the user indicating an edit of the video content. The graphical user interface can be implemented in a DVD player device, the video content can include DVD content, and the input control can include a scene selection function for viewing a scene of the DVD content in the DVD player device. The graphical user interface can be implemented in an online application generating a publicly available page for users to view videos, and the input control can include a content selection function for viewing contents of the videos on the publicly available page.

In a fourth aspect, a method includes executing instructions on a specific apparatus so that binary digital electronic signals representing a plurality of layouts generated from video content are obtained, each of the layouts comprising a visual summary of the video content at a respective zoom level, each visual summary including a plurality of frames selected from the video content and blended into the corresponding layout without borders between the frames. The method includes executing instructions on the specific apparatus so that binary digital electronic signals representing an animation between the plurality of layouts are stored, so that a user can zoom continuously between the zoom levels to view the visual summaries of the video content.

Particular embodiments of the subject matter described in this specification can be implemented to realize one or more of the following advantages. An improved summarization of video content can be provided. An improved navigation to a particular portion of video content can be provided. An improved zooming function in a navigation tool can be provided.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

Like reference numbers and designations in the various drawings indicate like elements.

DETAILED DESCRIPTION

Images shown in FIGS. 1-6 are ©2008 Jon Goldman and used here by permission.

Figure 1:
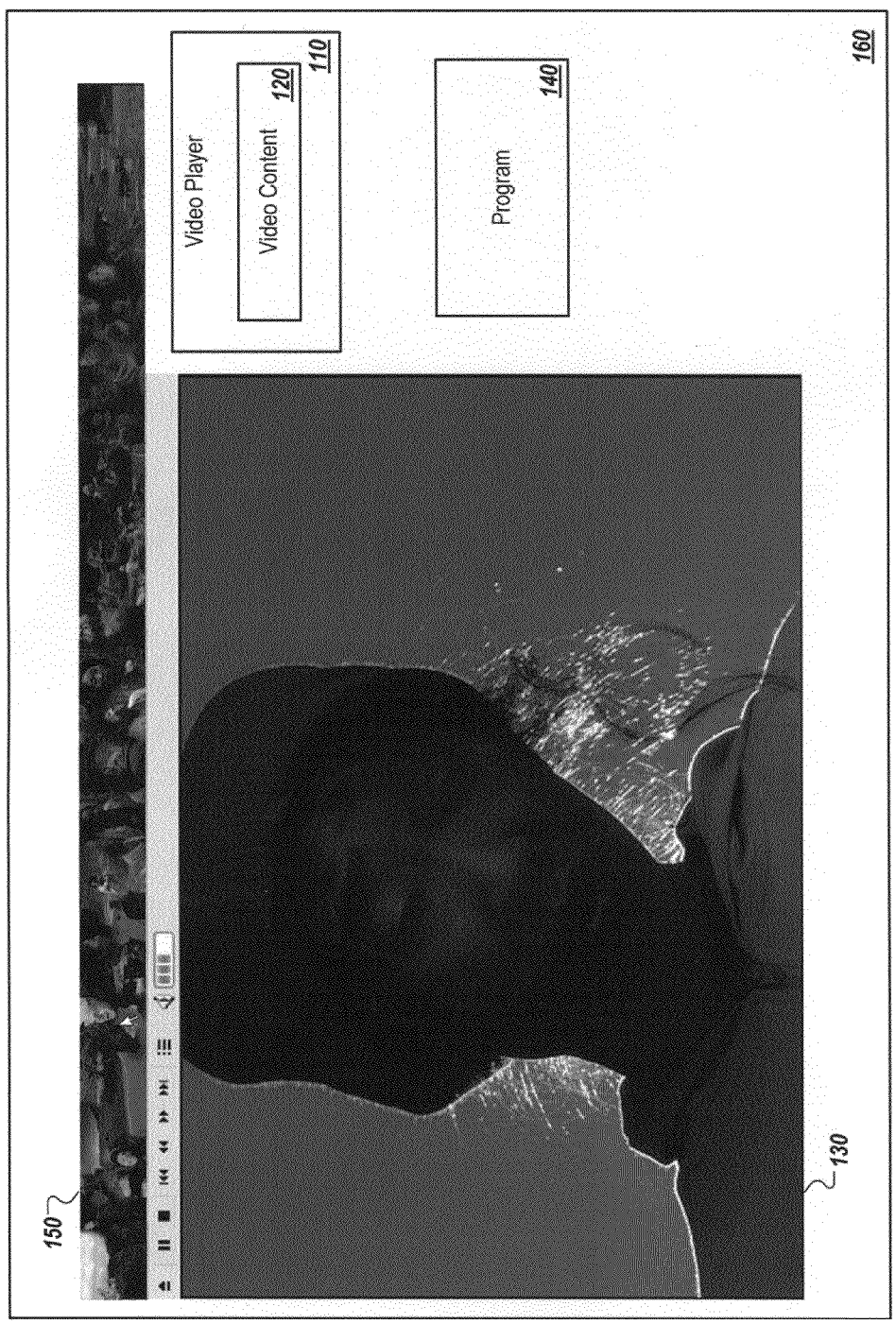
FIG. 1 shows an example system that can summarize video content.

FIG. 1 shows an example system 100 that can summarize video content. The system 100 can be implemented in any kind of computer, such as a personal computer, a server device, a handheld device, a video system or a DVD player. The system here includes a video player module 110 that is associated with video content 120. The video content 120 represents any of a number of possible image formats. That is, the video content is not restricted to merely a videotape format such as VHS, but rather is used to indicate any digitized images. Particularly, the video content 120 is acquired or created, either within the system 100 or elsewhere, at a sufficiently high frame rate to produce an illusion of motion when replayed, regardless of the images' original source or presentation medium. Additional examples of the video content 120 include, but are not limited to, video clips according to any digital encoding format, DVD content, and animated video game screens. The video player 110 can present the video content 120 on a display 130, such as a computer monitor, a TV screen or a screen of a DVD player.

The system 100 here includes a program 140 that can interact with the video player 110 and the video content 120. The program can be written in any language and can have any of a number of features described in following examples. In some implementations, the program can process the video contents and provide a visual summary thereof that can be helpful to a user. For example, the program can generate one or more tapestries 150 that present a tapestry-like summarization of at least part of the video content 120.

In this implementation, a left edge of the tapestry 150 represents the beginning of the video content 120. The flow of time in the video content, as perceived by a user watching it on the display 130, is then represented along a horizontal axis in the tapestry, with the right edge of the tapestry representing the end of the video content. Thus, the user can scan the tapestry from the beginning to the end to get an impression of what the video contents are, or to find a particular segment of the video, for example. The tapestry can be presented in a GUI 160, for example as a bitmap image. In some implementations, the display 130 is also generated in the GUI, such as adjacent or overlapping the tapestry in whole or in part. In other implementations the display can be generated by a separate device such as a monitor.

The tapestry 150 can interact with one or more components in the system 100, such as with the video player 120. In some implementations, the tapestry can be used as a control for activating the video player. For example, a user can select (such as by clicking on) any portion of the tapestry in the GUI 160 that the user is interested in. The video player can be configured to respond to this input and begin playing the video content 130, beginning at the point in the video corresponding to the user's selection. For example, the program 140 can first receiving the user's input, convert it to a format suitable for the video player, and forward the converted command to the video player, thereby causing it to begin playing the requested content.

Interactions such as those described in the example above can be useful in any of several different situations. In some examples, the tapestry 150 is implemented in a DVD player device to operate as a scene selection function. For example, a user who wishes to view a scene of a particular DVD content can locate the scene of interest in the tapestry, click on it, and thereafter be presented with that scene by the DVD device. In other examples, an online application generating a publicly available page (e.g., a web page) for users to view videos. The tapestry can then provide a useful way for viewers to scan the summaries of various available videos and launch any video for which the summary looks interesting, or pick out a portion of a video without having to fast forward from the beginning of the video. In other examples, the tapestry can be used in a video editing application so that a user can navigate to any portion of video content and modify the video by making input(s) in the editing application.

Figure 2:
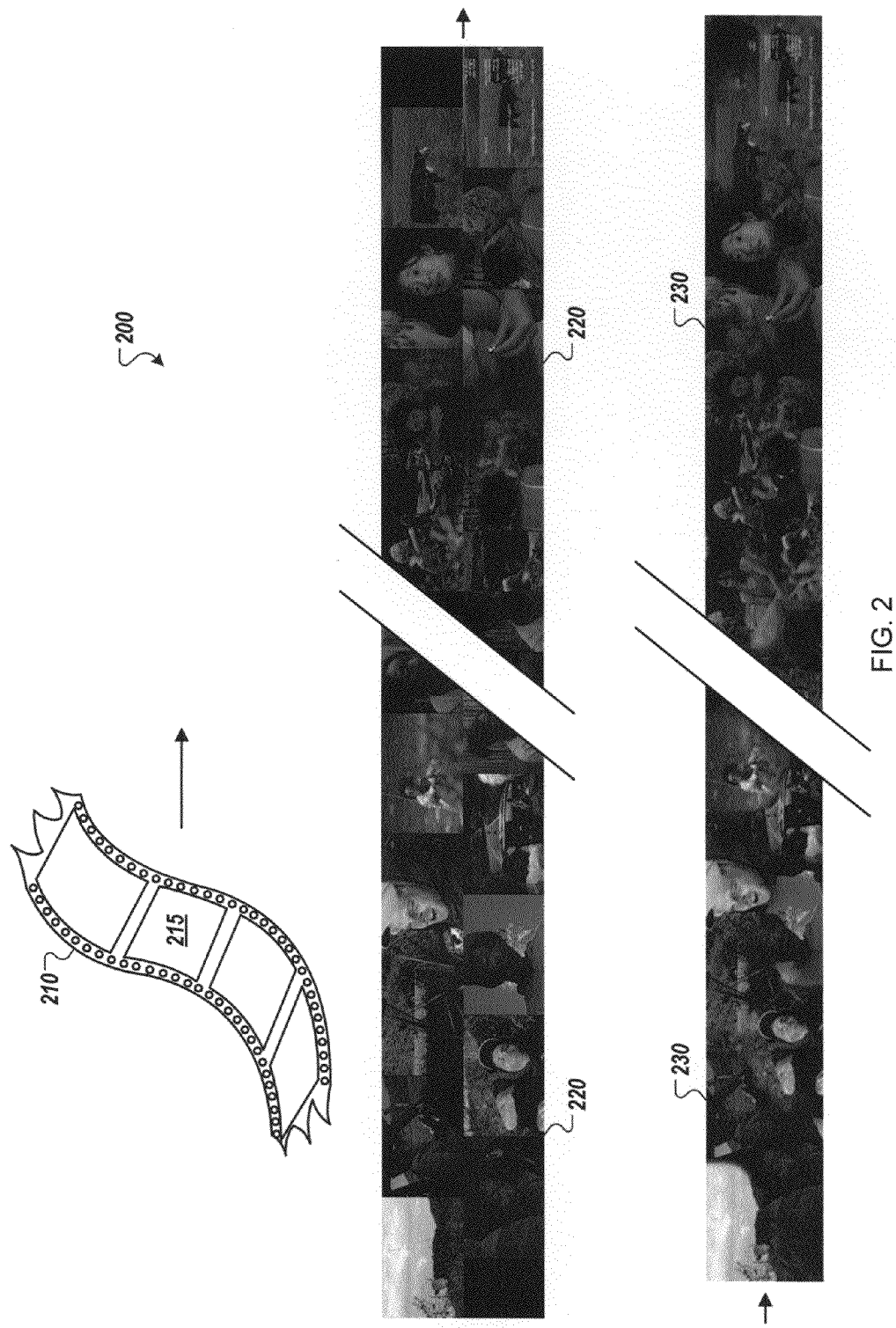
FIG. 2 schematically shows an example of summarizing video content.

FIG. 2 schematically shows an example of summarizing video content. In some implementations, a process 200 for summarizing video content can be performed in the system 100. The process 200 can be performed by a processor executing instructions in a computer-readable medium, for example as shown in FIG. 1.

The process 200 can begin with obtaining video content 210, such as from a DVD storage medium or from a computer memory. While the video content is here schematically illustrated as a reel-based medium with individually recognizable frames 215, many different video formats can be used for the video content 210.

Some of the frames 215 are selected to be included in the summary. In some implementations, this selection can be performed by choosing key frames within the video content 210. Generally, video summarization involves identifying the "important" information to be retained. More than one goal can be identified, however, in pursuing such approaches. For example, one can seek to create a summary that best communicates the story's semantic information in limited available space. As another example, one can seek to create a summary that is most aesthetically pleasing. In some implementations, these goals and/or one or more other goals can be balanced.

In some implementations, color information can be used in selecting one or more keyframes. This can be understood as a contrast to using, say, higher-level semantic information. For example, one can seek to choose the keyframe to communicate as much information as possible from the original video. As another example, one can make adjacent keyframes have similar colors along abutting edges. To address the former of these aspects, one can cluster similar frames with the intent of having each cluster represent important information from the film. For example, frames can be extracted from the video at a relatively low temporal resolution (e.g., 2 frames/sec) and be clustered. In some implementations, a K-medoids algorithm is used, which groups the frames in clusters and seeks to select members (medoids) thereof so as to minimize a "distance" (i.e., an error) between the medoid and remaining cluster members.

Assume, for example, that frames A and B occurring at times $t_j$ and $t_2$ are being considered. In some implementations, a distance $D_{total}(A,B)$ can then be defined as:

$$D_{total}(A,B) = D_{sim}(A,B) + Q(t_1-t_2)^2 \quad (1)$$

In (1), Q can be a user-chosen penalty that controls whether timewise distant but visually similar frames are merged. $D_{sim}(A, B)$ can be a patch distance metric between images A and B, for example as defined in D. Simakov et al., Summarizing visual data using bidirectional similarity, in proceedings from IEEE Computer Society Conference on Computer Vision and Pattern Recognition 2008, the contents of which are incorporated herein by reference. Particularly, in some implementations the distance metric can be defined as $$D_{sim}(A, B) = \frac{1}{N_A} \sum_{a \subset A} \min_{b \subset B} D(a, b) + \frac{1}{N_B} \sum_{b \subset B} \min_{a \subset A} D(a, b) \quad (2)$$

In (2), the metric D(a, b) can be the distance between 7×7 pixel patches, for example. The number of clusters used can be fixed and set by a user. In (2), a and b can be small 7×7 pixel patches in A and B respectively, for example, and $N_A$ and $N_B$ can be the number of all such patches in A and B respectively.

The process 200 generates one or more layouts 220 based on the frames selected from the video content 210. In some implementations, the layout 220 is formed by placing frame contents side-by-side in one or more rows. For example, one or two rows of frames can be used. The available positions where the frames can be placed can be fixed, and an algorithm (such as part of the program 140) can choose which frame is placed in each layout space. For example, frames can be placed in a generally chronological order from left to right in the layout, alternating between upper and lower rows in multi-row implementations.

In some implementations, the layout 220 can be generated as follows. A tapestry author/editor can select several semantically important keyframes and locate them manually on the layout with gaps between them. That is, one or more steps in creating a tapestry can be performed manually by an author; that is, by entering commands into a suitable computer device that manipulates the images. An automatic algorithm can find the best keyframes from the rest of the frames (or from the rest of the clusters if clustering is done as a pre-process) to fill in the gaps.

In some examples, a user can choose between a one or two row layout. Here, the layout 220 is formed in a brickwork-like pattern where an upper row of frames is offset from a lower row of frames by a specified amount.

In some implementations, the layout can have any other form. For example, when a video has very weak or no importance of time, the tapestry can be generated with an arbitrary shape. This can include homemade videos where the important content could be people and their locations (e.g. kids playing in the play yard, or a video of a party), videos that capture different places or objects (walking with a handheld camera in a house or downtown), video games where the tapestry can capture the different backgrounds/creatures that appeared in the video of the game, to name a few examples. These cases have in common that an author may prefer a tapestry of an arbitrary shape (e.g. a rectangle) as opposed to horizontal. A multi-layer zoomable tapestry can still be applicable in such implementations. The arrangement could be done manually, for example if the videos are short. Other patterns for arranging frames in a layout can be used.

In some implementations, keyframes that are adjacent in the layout are chosen so that they have similar colors along their shared edge(s). This can produce aesthetically pleasing summaries. For example, a distance $D_{AB}^{adj}$ between adjacent images A and B can be defined. For a one-row case, the distance can be defined as $D_{sim}$, between the left or right halves of A and B nearest the shared edge. In the two-row case, the distance can be defined as $D_{sim}$ between the upper-left, upper-right, lower-left or lower-left quarters of A and B nearest the shared edge.

In some implementations, an algorithm can be used to choose the particular frames to be placed in the layout 220.

For example, the algorithm can minimize the sum of $D^{adj}$ over all shared edges under the constraint that one frame be chosen from every cluster before any cluster has two elements. The constraint can prevent that a trivial solution is obtained where the tapestry includes duplicate or similar frames. An algorithm can be initialized by choosing frames uniformly in time. For example, a so-called greedy algorithm can proceed by greedily improve the current solution by trying, for every space in the layout, all possible frames, and updating the current solution if the summed error decreases and the number of violations of the constraint does not increase.

In some implementations, instead of the greedy algorithm for arranging the layout, the problem can be formulated as a Markov Random Field on a graph. In such an example, the labels/states in each node can be the space of all possible keyframes, and the input can be a set of compatibility matrices that contain the similarity between each pairs of keyframes according to the similarity of their boundaries (in all directions according to their time differences). Moreover, the likelihood term in each node could reflect some user preference for some particular keyframes to appear in some nodes. A global edge can be added to all nodes to avoid the same keyframe appearing multiple times. The MRF can be solved to find the best assignment of keyframes using standard optimization techniques for MRFs such as Loopy Belief Propagation or Graph Cuts. Other algorithms can be used, for example to include more robust distance metrics.

An algorithm can thus be run once with an initial number of frames to produce a tapestry 230. For example, discrete keyframe layouts can be blended together to remove hard borders. In some implementations, this can be done by a gradual summarization algorithm, such as the one described in the Simakov article referenced above. For example, a bidirectional similarity measure can be evaluated between the video content 210 and each of the layouts 220.

In some implementations, the bidirectional similarity measure can involve taking into account a completeness criterion of each layout with regard to the video content. For example, the layout 220 can be considered complete with regard to the video content 210 if every aspect of the video content is represented in the layout. In some implementations, the bidirectional similarity measure can involve taking into account a coherence criterion of each layout with regard to the video content. For example, the layout 220 can be considered coherent with regard to the video content 210 if every aspect of the layout comes from the video content.

Bidirectional similarity (BDS) can be estimated. In some implementations, a randomized approximation algorithm for estimating bidirectional similarity can be provided. In such an approach, the dimensionality of offset space can be handled as follows. Although the dimensionality of the patch space is large ($k^2$ where k is the patch width), the space is sparsely populated ($0(n)$ points, where n is the number of pixels in the image to be searched). Therefore one can search over the space of offsets into the target image, rather than the space of patches in the target image. Here we apply a more specific notation for a patch P=S(i; j), which is the patch with upper-left corner at column i and row j. Thus, the offset between patch S(i; j) and a corresponding patch T(k; l) in the target image is simply (k−i; l−j). If the two images are identical, then the best correspondence $\arg\min_{k,l} (D[S(i; j); T(k; l)]) = (i, l)$ for all (i, j).

Coherence of offsets can be handled as follows. If the images are sufficiently similar, the original BDS method typically converges to a partially continuous solution, with many large salient regions copied to the output with minimal distortions. That is, most offsets of nearby patches in the source image are likely to be nearly identical. On the other hand, if the images are not particularly similar, then the true bidirectional similarity is likely to be close to the similarity of random patches within the images.

The law of large numbers can be considered as follows. In a large image, even a random offset for each patch is likely to be a good guess for some patches. Paradoxically, the chance that no patch will have a correct offset gets lower as the image dimensions increase.

The application of these three simple observations leads us to the algorithm of this example.

We define auxiliary objects $O_S$ and $O_T$. $O_S$ is the current "best guess" offsets (k−i; l−j) for all patches S(i; j), and $O_T$ is similarly defined. The offsets can be stored in "images" of the same size as the source and target images S and T: Pixel $O_S(i;j)$ contains the current offset (k−i; l−j) such that the corresponding patch Q in T is found at coordinate (k, l). The algorithm will proceed by iteratively improving the estimates $O_S$ and $O_T$ so that they approach $\min_{Q \subset T} D(P,Q)$ and $\min_{P \subset S} D(Q, P)$ in the limit.

Thus, the core of the algorithm is repeated evaluation of the approximate distance metric $$\bar{d}(S,T) = \bar{d}_{complete}(S,T) + \bar{d}_{cohere}(S,T) \quad (3)$$

$$\bar{d}_{complete}(S, T) = \frac{1}{N_S} \sum_{(i,j)} D[S(i, j), T((i, j) + O_S(i, j))] \quad (4)$$

$$\bar{d}_{cohere}(S, T) = \frac{1}{N_T} \sum_{(i,j)} D[T(i, j), S((i, j) + O_T(i, j))] \quad (5)$$

and iterative modification of the offsets $O_S$ and $O_T$, converging toward the true distance d(S, T).

The algorithm has three phases: initialization, followed by alternating rounds of propagation and random search. Examples of these will be described in order.

We assume that T is similar to S, since it is produced by an iterative "gradual resizing" method as described in Simakov et al., Summarizing visual data using bidirectional similarity, in proc. *IEEE Conference on Computer Vision and Pattern Recognition (CVPR)*, 2008. This ensures that its individual patches do not differ dramatically from those of S. T can be produced by interpolation of the missing region boundaries. $O_S$ and $O_T$ can be initialized with random offsets in the domain of T and S, respectively. Although the odds of any one pixel being assigned the best offset in this initial guess are vanishingly small (1/n), the odds that at least one pixel in the image is correctly assigned are quite good $(1-(1-1/n)^n)$ for large images. Furthermore, the odds that a pixel is assigned an offset close to the correct offset are excellent $(1-(1-m/n)^n)$.

Other possible initializations for $O_S$ and $O_T$ that may improve performance include:

Seeding. A small number of patch offsets could be initialized using a full k−d tree search, to "seed" the initial estimates with a few pixels guaranteed to be optimal.

Rough initial search. Approximate nearest neighbors could be found using simple features such as a smaller patch size or even a single pixel, a reduced-dimensionality patch, or a search with a "fast" metric such as $L_2$.

In the propagation phase, we loop through each pixel in $O_S$, attempting to improve $D[S(i,j), T((i,j)+O_S(i,j)]$ by searching the offsets of its neighbors. That is, $$(u, v) \leftarrow \arg\min_{(k,l)\in \mathbb{N}(i,j)} D[S(i, j), T(i, j) + O_S(k, l))] \quad (6)$$

$$O_S(i,j) \leftarrow O_S(u,v) \quad (7)$$

where $\mathbb{N}$ is the k-neighborhood of a particular offset pixel. Possible values of k could be 4, 8, 24, etc. In our experiments we have used the 4-neighborhood.

We do the same for $O_T$, and as we do this we can simultaneously search through the neighborhood of the pre-image:

$$X(i,j) \leftarrow \{(x,y) | O_T(x,y)+(x,y)=(i,j)\} \quad (8)$$

$$(u, v) \leftarrow \arg\min_{(k,l)\in \square(x,y) \forall (x,y)\in X(i,j)} D[S(i, j), T(k, l)] \quad (9)$$

$$O_S(i,j) \leftarrow (k-i, l-j) \quad (10)$$

Since this algorithm is order-dependent, propagating lucky guesses only in the order of the pixel loops, one can alternate each iteration switching from right-to-left/top-to-bottom to left-to-right/bottom-to-top. The order can also be changed randomly or using any variety of space-covering patterns.

If we only repeat the propagation phase, the algorithm will quickly converge to a local minimum, since propagation can only occur in nearby regions. We therefore include a random search to overcome these local minima and guarantee convergence to the global optimum in the limit. For each pixel in $O_S$, we test a random set of alternate patches in T. This set could have an arbitrary distribution, but in one implementation they could be placed at an exponentially decreasing distance from the current guess:

$$cand(i,j,t) \leftarrow O_S(i,j) + \omega\alpha^{-t}(a,b) \quad (11)$$

$$O_S(i, j) \leftarrow \arg\min_{(k,l)\in cand(i,j,t)} D[S(i, j), T(k, l)] \quad (12)$$

in which $\omega$ is a fixed large distance (such as the image width) and a and b are random variables in the domain [−0.5, 0.5]. We repeat the assignments in Equations 11 and 12 starting with t=0 and incrementing t until $\omega\alpha^{-t}$ is 1 pixel or less. This allows us to jump quickly to distant patch locations and then sample more locally in that region. In an example, $\omega$ is equal to the larger of image weight or height, and $\alpha$=2.

The propagation and random search phases are done in the inner loop over each pixel.

In some implementations, the initial layout image can be resized according to a coarse-to-fine scheme. Such a resizing process can cause frames to blend together, and can remove redundant detail, but can avoid removing unique content. The amount of resizing can be a user parameter. For one row tapestries, as an example only, one can use 75%×100% resizing in the X and Y dimensions, respectively, and for two row tapestries 100%×75% resizing can be used.

To avoid distortion of an image feature such as faces, weights can be used. In some implementations faces can be weighted, for example as described in the Simakov article referenced above. In some examples, an output of an automatic face detector described by Bourdev and Brandt can be used (Robust object detection via soft cascade, in proceedings from CVPR 2005, IEEE Computer Society, 2236-243, the contents of which are incorporated herein by reference). Accordingly, the feature to be weighted, such as faces, can be selected and the blending can then be performed such that appropriate weighting is applied to the selected feature(s).

To encourage blending between frames a mask can be used that prevents patches that overlap with a frame border from being chosen by the search process. For example, a kd-tree can be used for approximate nearest neighbor search. At high resolutions a tree can consume significant amounts of memory, so rather than storing the entire patch for each kd-node in memory, only a pointer to the upper-left coordinate can be stored, as an example.

In some implementations, the tapestry 230 that is first created is for a coarsest zoom level. Tapestries for one or more higher zoom levels i=1, 2, . . . d−1 can then be created, where d is the number of zoom levels. The number of frames in the respective zoom levels can be $n_i = n_0 \lambda^i$. For example, $\lambda$=1.5 can be used.

Figure 3:
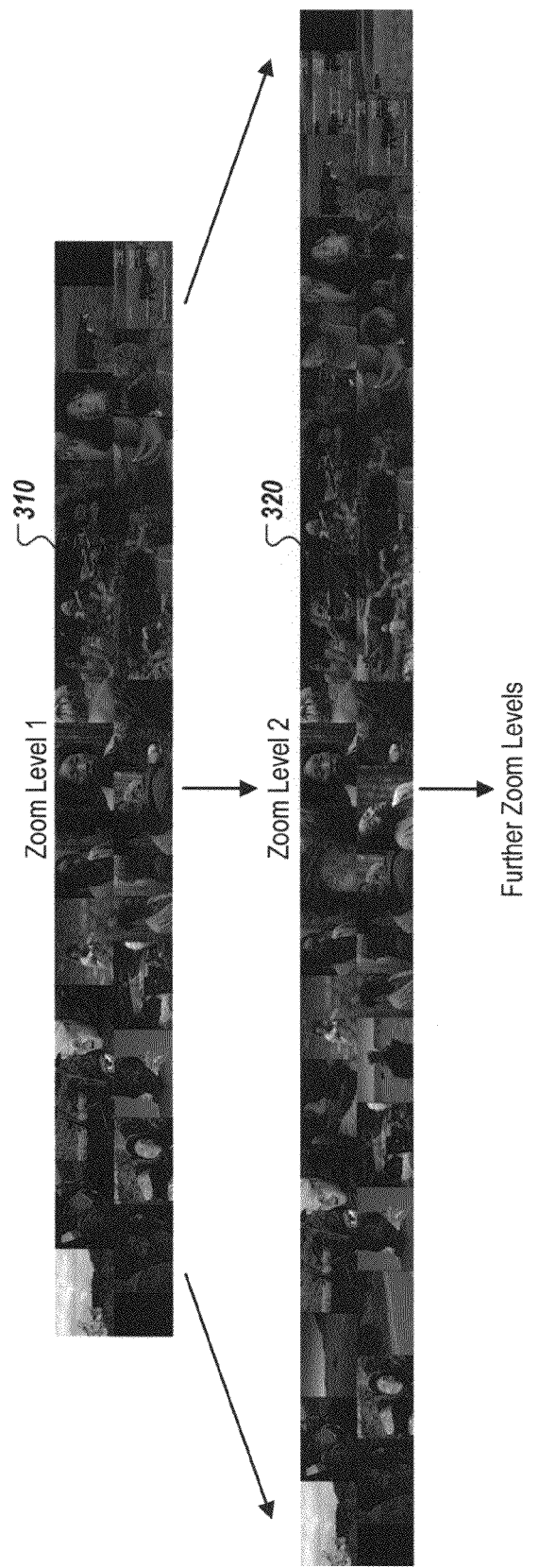
FIG. 3 schematically shows examples of layouts generated from video content

To provide for user zooming from one level to another, new frames can be added to the layout uniformly in a dimension (e.g., horizontally) as unknown'entities that will be solved for, while existing frames may remain from one level to the next. An optimization can then be re-run to solve for the new unknown frames, with the solution at each zoom level being calculated from the previous zoom level. FIG. 3 schematically shows examples of layouts 310 and 320 generated from video content. for example, each of the layouts 310 and 320 can be generated in accordance with the description above regarding the layout 220. Each of the layouts includes selected frames organized in rows. The layout 310 is considered to be at zoom level 1 and the layout 320 at zoom level 2. As can be seen, the layout 320 includes frames from the layout 310 and also includes additional frames from the video content that are not visible in the layout 310. More zoom levels can be used. Also, frames in any zoom level can be user selectable, for example to provide for user navigation to that frame in the video content. Thus, navigation can be provided from each tapestry to video content such that a user can initiate presentation of the video content from a frame by selecting that frame in at least one of the tapestries.

Figure 4:
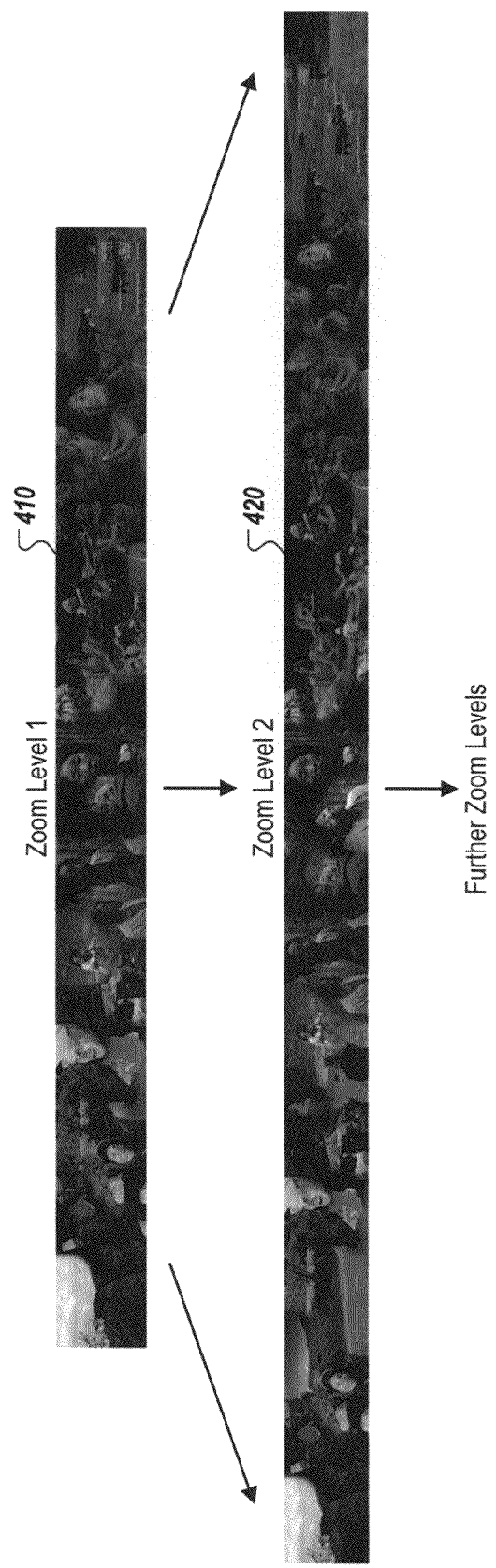
FIG. 4 schematically shows examples of tapestries at zoom levels.

FIG. 4 schematically shows examples of tapestries 410 and 420 at zoom levels. For example, each of the tapestries 410 and 420 can be generated in accordance with the description above regarding the tapestry 230. Accordingly, a user who is presented with the tapestry 410 can zoom in to see more details about the video content, and can then be presented with the tapestry 420, or vice versa.

Figure 5:
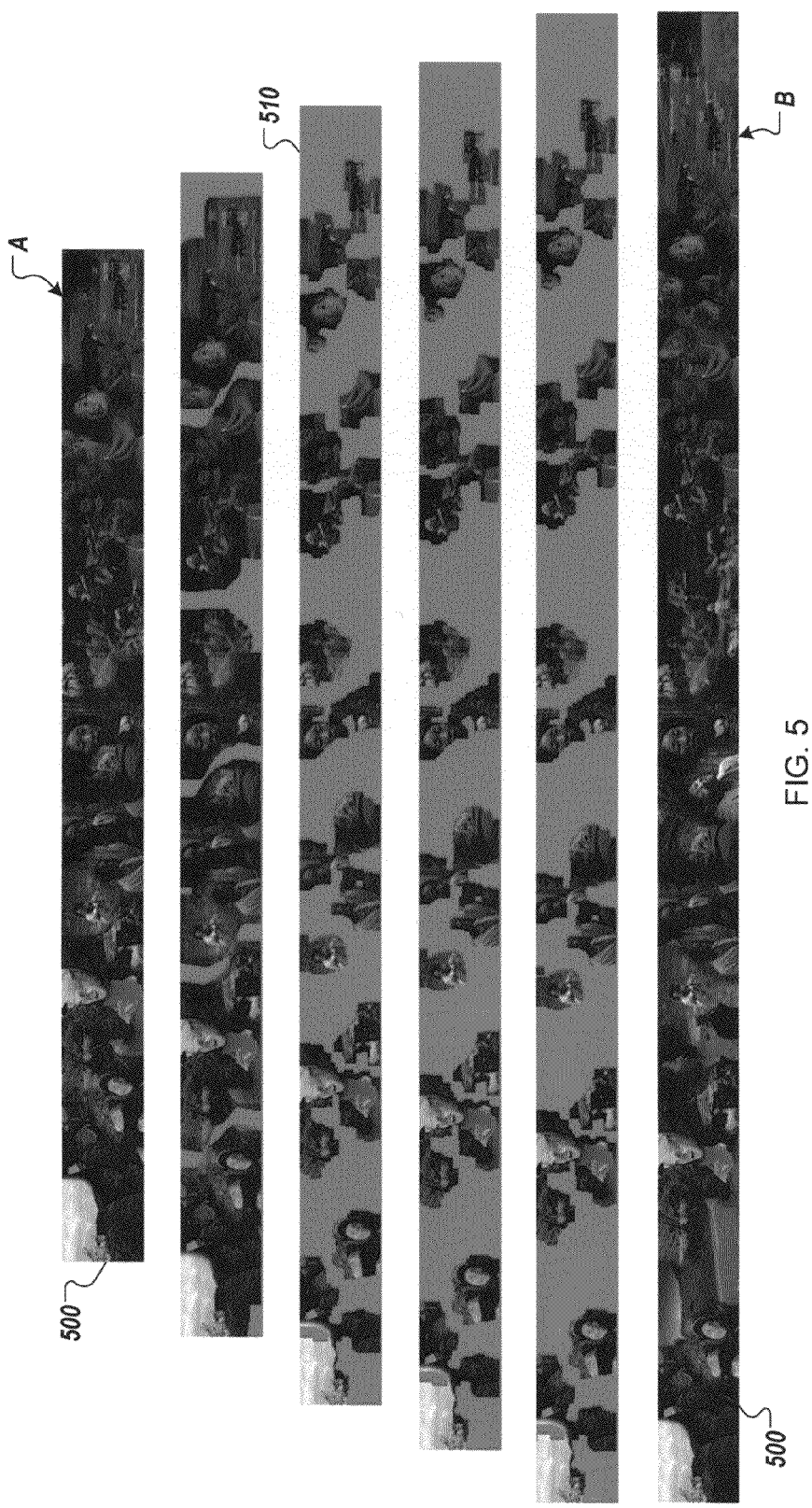
FIG. 5 shows an example of spacetime between tapestries being filled.

FIG. 5 shows an example of spacetime between tapestries being filled. A final stage in a pipeline can involve creating animation between each of the discrete zoom levels, such as the tapestries 410 and 420. In some implementations, the spacetime volume between the discrete tapestries is filled in during this process, so that continuous zoom is possible. Assuming that each of d tapestries is $\lambda$ times larger than the previous, the spacetime volume is trapezoidal in shape, with the image width continuously increasing with increasing time. To construct a zoom sequence between a smaller tapestry A and larger tapestry B at zoom levels i and i+1 respectively, a constrained variant of the algorithm described by Simakov can be used. Because tapestry A's frames are also visible in B, corresponding color regions can be identified, for example by doing approximate nearest neighbor matching of A's patches against B's patches. In some implementations, 7×7 patches are used. To verify that the matching color regions are stable under small perturbations, a scalar can be computed. For example, at every (x, y) of A a scalar similar to divergence can be computed according to:

$$\nabla(x, y) = \max_{\substack{a=-w \ldots w \\ b=-h \ldots h}} \|N(x+a, y+b) - (N(x, y) + (a, b))\| \quad (3)$$

Here, N(x, y) are the coordinates of the nearest neighbor patch in image B to patch (x, y) in image A. One or more thresholds can be used. For example, one can threshold against a maximum divergence, such as 10 for windows of size w, h=5, 5, and retain only the patch correspondences below this divergence. Connected components of the remaining correspondence coordinates in image A can then be found, and components less than a second threshold size can be removed. For example, this can be done because small corresponding regions often give matches that are false positives between similar image features.

The remaining connected components form large islands 500 of color data which are present in both image A and B, but at different positions. In the animation between images A and B one can constrain these islands to move at constant velocity. A morphing algorithm can fill in all color data 510 outside the islands, so that as one moves from time t=0 to t=1 the image changes continuously from A to B. If the morphing algorithm is initialized with image B and not guaranteed to converge to image A, one can inflate the size of the islands for t<τ linearly in time so that at t=0 the islands have been inflated exactly by the amount needed so every pixel belongs to an island, forcing convergence to image A.

To fill in the non-island color data 510 in the spacetime volume, one can initialize with image B, and for each time value t=1 . . . 0 in small increments of t, do the following:
Resize the image in the X dimension, so image width changes linearly from B's width to A's width in time.
Paste the constrained color data for the islands.
Apply an iterative update rule, such as the one described in the Simakov article, until convergence, matching solely against B's color patches if t>τ and against both A and B's color patches if t<τ, taking a weighted average of the resulting color votes by weights (1−t/τ, t/τ) respectively.

In some implementations, the iterative update is applied at the finest resolution only, without a coarse-to-fine image pyramid. Subpixel matching and rendering can be used to remove nearest-neighbor aliasing artifacts. As another example, the zoom animation can be rendered at a higher resolution than needed and then be downsampled.

Figure 6:
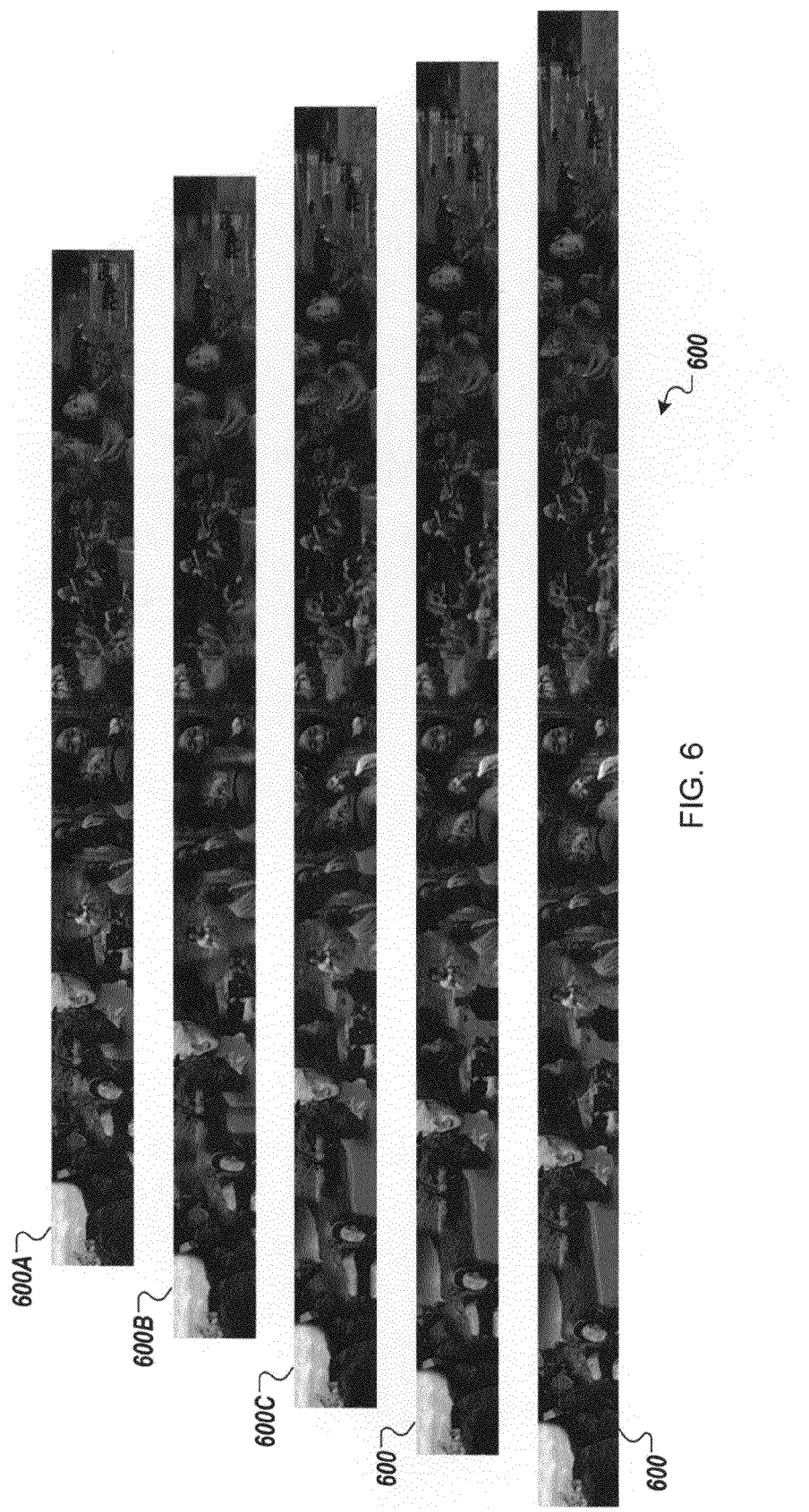
FIG. 6 shows tapestries in an animated zoom sequence.

FIG. 6 shows tapestries 600 in an animated zoom sequence. While each of the tapestries 600A-E is visible in this illustration, it is noted that in an implementation, such as the system 100, only one of the zoom levels can be visible at any given time. Moreover, tapestries 600A-E can provide continuous zooming, such as from a low zoom level (e.g., tapestry 600A) toward a high zoom level (e.g., tapestry 600E), or vice versa. The continuous zooming can include an essentially smooth transition from any one zoom level to the next, substantially free of jerky movements and uneven image behavior, analogous in appearance to the continuous zooming that can be seen when adjusting an optical or digital zoom function on a camera. Thus, the tapestries 600 can provide a useful way for a user to view one or more summaries of video content.

The following is an example of how the tapestries 600 can be used, for example in the system 100. The system 100 can receive an input that a user generates by clicking on the tapestry 600. The system 100 can select a frame in the video content based on where in the tapestry 600 the user clicks. The system 100 can present, in response to the user input and on the display 130, at least part of the video content 120 beginning at the frame. By generating another input, the user can cause the tapestry 600 to assume another zoom level, from where the user can choose another frame for starting the video, or continue viewing the summary, to name a few examples.

A user interface according to the examples described herein can be useful for video related applications such as a video editing timeline or a DVD scene selection function. Such an interface can present the user with a coarsest zoom level of the tapestry. Clicking and dragging can cause the tapestry to pan, while scrolling can cause the tapestry to zoom in on a location of the mouse cursor. For example, this can involve triggering the appropriate zoom sequence and using nearest neighbor patch matching (e.g., averaged over a number of surrounding 7×7 patches) to keep the expanding zoom animation centered on the mouse location. Right clicking can cause an attached video player to play starting from the frame visible under the mouse. To determine the frame under the mouse, averaged nearest-neighbor patch matching can be done against the output from the keyframe selection stage.

Some portions of the detailed description are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer-readable medium. The propagated signal is an artificially generated signal, e.g., a machine-generated electrical, optical, or electromagnetic signal, that is generated to encode information for transmission to suitable receiver apparatus for execution by a computer. The computer-readable medium can be a machine-readable storage device, a machine-readable storage substrate, a memory device, a composition of matter effecting a machine-readable propagated signal, or a combination of one or more of them.

The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), M a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer program product embodied in a non-transitory program carrier and comprising instructions that when executed by a processor perform a method comprising:
    obtaining a plurality of layouts generated from video content, each of the layouts comprising a visual summary of the video content at a respective zoom level, each visual summary including a plurality of frames selected from the video content and blended into the corresponding layout without borders between the frames; and
    creating an animation between the plurality of layouts so that a user can zoom continuously between the zoom levels to view the visual summaries of the video content;
    wherein creating the animation comprises finding connected components that are present in both the first and second layouts, and constraining the connected components to move at a constant velocity in the animation.

2. The computer program product of claim 1, further comprising:
    configuring each of the plurality of layouts to form a tapestry showing the corresponding visual summary; and
    providing navigation from each tapestry to the video content such that the user can initiate presentation of the video content from a frame by selecting that frame in at least one of the tapestries.

3. The computer program product of claim 1, wherein obtaining the plurality of layouts comprises:
    selecting the plurality of frames from the video content;
    assembling the plurality of frames side-by-side in a pattern; and
    blending the plurality of frames into the corresponding layout, including removing borders between the frames.

4. The computer program product of claim 3, wherein the pattern includes a brickwork-like organization of the frames in at least two rows, wherein the rows are merged into one in the blending.

5. The computer program product of claim 3, wherein the blending takes into account a bidirectional similarity measure between the video content and the layouts, including a completeness criterion of each layout with regard to the video content, and a coherence criterion of each layout with regard to the video content.

6. The computer program product of claim 3, further comprising:
    selecting a visual feature present in at least part of the video content; and
    weighting the visual feature in performing the blending.

7. The computer program product of claim 1, wherein creating the animation comprises:
    filling in spacetime gaps between the first and second layouts, the first layout being smaller than the second layout and the first zoom level being lower than the second zoom level.

8. The computer program product of claim 7, wherein filling in the spacetime gaps comprises:
    identifying corresponding color regions in the layouts, including performing an approximate nearest-neighbor matching of patches from the first layout to the second layout.

9. The computer program product of claim 8, further comprising:
    verifying that matching color regions are stable under small perturbations, including: (i) calculation of scalar values for points in the first layout depending on a difference in coordinates between nearest-neighbor patches; (ii) selecting patches of the first layout based on the scalar values and at least one threshold value; and (iii) generating at least one additional layout using the selected patches, the additional layout filling in the spacetime gap between the first and second layouts.

10. The computer program product of claim 9, wherein the selected patches form island images of color data that are present at different positions in both the first and second layouts, the method further comprising:
    defining time values corresponding to the animation from the second layout to the first layout; and
    for each of the time values: (i) resizing the second layout so that its image width changes linearly from a second-layout width to a first-layout width; (ii) inserting constrained color data for the island images; and (iii) applying an iterative update rule to patches until convergence.

11. The method of claim 1, wherein creating the animation further comprises filling in color data outside the connected components so that as the user zooms continuously between the first and second zoom levels the visual summary changes continuously between the first and second layouts.

12. A method comprising:
    executing instructions on a specific apparatus so that binary digital electronic signals representing a plurality of layouts generated from video content are obtained, each of the layouts comprising a visual summary of the video content at a respective zoom level, each visual summary including a plurality of frames selected from the video content and blended into the corresponding layout without borders between the frames;
    executing instructions on the specific apparatus so that binary digital electronic signals representing an animation between the plurality of layouts are created, so that a user can zoom continuously between the zoom levels to view the visual summaries of the video content;
    wherein creating the animation comprises finding connected components that are present in both the first and second layouts, and constraining the connected components to move at a constant velocity in the animation; and
    storing the resulting binary digital electronic signals representing the animation between the plurality of layouts in a location in memory of said specific apparatus for later use.

13. A system comprising:
    one or more processors; and
    computer program product with instructions that when executed perform a method comprising:
        obtaining a plurality of layouts generated from video content, each of the layouts comprising a visual summary of the video content at a respective zoom level, each visual summary including a plurality of frames selected from the video content and blended into the corresponding layout without borders between the frames; and creating an animation between the plurality of layouts so that a user can zoom continuously between the zoom levels to view the visual summaries of the video content;
wherein creating the animation comprises finding connected components that are present in both the first and second layouts, and constraining the connected components to move at a constant velocity in the animation.

* * * * *